United States Patent
Murray et al.

(10) Patent No.: US 11,417,214 B2
(45) Date of Patent: Aug. 16, 2022

(54) VEHICLE TO VEHICLE SECURITY

(71) Applicant: FORD GLOBAL TECHNOLOGIES, LLC, Dearborn, MI (US)

(72) Inventors: James Nicholas Murray, Chelmsford (GB); Benjamin Moffatt, Iver Heath (GB); William Barker, Berkhamsted (GB); Gemma Lord, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/088,887

(22) Filed: Nov. 4, 2020

(65) Prior Publication Data
US 2021/0129793 A1 May 6, 2021

(30) Foreign Application Priority Data
Nov. 4, 2019 (GB) ..................... 1916035

(51) Int. Cl.
*G08G 1/16* (2006.01)
*B60R 25/102* (2013.01)
(Continued)

(52) U.S. Cl.
CPC ........... *G08G 1/166* (2013.01); *B60R 25/102* (2013.01); *G08G 1/16* (2013.01); *B60R 25/1012* (2013.01);
(Continued)

(58) Field of Classification Search
CPC .......... G08G 1/00; G08G 1/0965; G08G 1/16; G08G 1/162; G08G 1/166; G08B 13/00;
(Continued)

(56) References Cited

U.S. PATENT DOCUMENTS

| | | | | |
|---|---|---|---|---|
| 4,794,394 A | * | 12/1988 | Halstead ............... | G08G 1/087 340/901 |
| 10,205,915 B2 | * | 2/2019 | Araya .................... | G01S 19/17 |

(Continued)

FOREIGN PATENT DOCUMENTS

| EP | 2983357 A2 | 2/2016 |
|---|---|---|
| WO | 2013100993 A1 | 7/2013 |
| WO | 2017155448 A1 | 9/2017 |

OTHER PUBLICATIONS

NPL_search.pdf (Jul. 26, 2021).*
Examination Report GB 1916035.7 Completed Jul. 23, 2020. 5 pages.

*Primary Examiner* — Van T Trieu
(74) *Attorney, Agent, or Firm* — Michael J. Spenner; Brooks Kushman P.C.

(57) ABSTRACT

A controller for a first vehicle is configured to, when a security system of the first vehicle is activated, transmit a vehicle-to-vehicle signal to a second vehicle, the signal comprising instructions that, when executed by a controller of the second vehicle, cause the controller of the second vehicle to activate a security system of the second vehicle. A method includes determining whether a security system of a first vehicle is activated and, if it is determined that the security system is activated, transmitting a vehicle-to-vehicle signal to a second vehicle, the signal comprising instructions that, when executed by a controller of the second vehicle, cause the controller of the second vehicle to activate a security system of the second vehicle.

15 Claims, 5 Drawing Sheets

(51) Int. Cl.
  *H04W 4/46* (2018.01)
  *B60R 25/10* (2013.01)
  *B60R 25/30* (2013.01)
  *B60R 25/31* (2013.01)
  *H04W 4/02* (2018.01)

(52) U.S. Cl.
  CPC ........... *B60R 25/302* (2013.01); *B60R 25/305* (2013.01); *B60R 25/31* (2013.01); *H04W 4/023* (2013.01); *H04W 4/46* (2018.02)

(58) Field of Classification Search
  CPC ....... B60R 25/00; B60R 25/10; B60R 25/102; B60R 25/104
  See application file for complete search history.

(56) References Cited

U.S. PATENT DOCUMENTS

| | | | |
|---|---|---|---|
| 10,582,163 B2* | 3/2020 | Hodge | H04N 21/44004 |
| 2005/0275510 A1 | 12/2005 | Li | |
| 2009/0027188 A1* | 1/2009 | Saban | B60N 2/002 340/521 |
| 2010/0164719 A1* | 7/2010 | George | G08B 27/001 340/541 |
| 2016/0311401 A1 | 10/2016 | Altawil et al. | |
| 2017/0113664 A1 | 4/2017 | Nix | |
| 2018/0072263 A1 | 3/2018 | Green | |
| 2018/0126951 A1 | 5/2018 | Ricci | |
| 2018/0218582 A1 | 8/2018 | Hodge et al. | |
| 2020/0247359 A1* | 8/2020 | Murray | G05D 1/0214 |

* cited by examiner

VEHICLE TO VEHICLE SECURITY

CROSS-REFERENCE TO RELATED APPLICATION

This application claims foreign priority benefits under 35 U.S.C. § 119(a)-(d) to GB Application 1 916 035.7 filed Nov. 4, 2019, which is hereby incorporated by reference in its entirety.

TECHNICAL FIELD

The present disclosure relates to a controller to transmit a signal to a vehicle that will activate a security system of that vehicle, and to a method for activating a security system of a vehicle.

BACKGROUND

Some vehicles are fitted with control systems for the purpose of informing a user when there is a suspected or attempted attack on the user's vehicle. For example, data containing details of the attack (such as captured images or video data) may be transmitted to a user's device, such as a smart device or computer.

SUMMARY

The present disclosure relates to instances where an attack has taken place on a vehicle, or has nearly taken place on the vehicle, and the attacker (or would-be attacker) has moved away from the vehicle, possibly to attempt an attack on another vehicle. In such situations, for example if a thief is running away from a vehicle that they have broken (or attempted to break) into the thief may be at a location too remote from the original vehicle to be picked up by that vehicle's sensors, since some vehicle sensors may only be capable of tracking the thief over short distances. Accordingly, the ability of a user to track the thief once the thief has moved on from their own vehicle may be limited in some instances by the range of the vehicle's sensors. The present disclosure addresses this problem by providing a controller of a first vehicle that is configured to activate a security system of a second vehicle when the security system of the first vehicle is activated.

According to one example of this disclosure, there is provided a controller for a first vehicle, the controller being configured to, when a security system of the first vehicle is activated, transmit a vehicle-to-vehicle signal to a second vehicle, the signal comprising instructions that, when executed by a controller of the second vehicle, cause the controller of the second vehicle to activate a security system of the second vehicle.

Therefore, if a thief or would-be thief performs any activity around the first vehicle that is sufficient to activate its security system, the controller will transmit a signal to another vehicle that will cause the other vehicle's security system to be activated. In this way, when the first vehicle comprises the controller (in other words, when the controller is provided in the first vehicle, as opposed to being remote from the first vehicle), activation of the first vehicle's security system will cause the security system of another vehicle to be activated. In effect, this allows one vehicle to communicate a break-in or attempted break-in to other vehicles, for example to an entire fleet of vehicles. Each vehicle in the fleet that the controller may transmit its signal to may be within a predetermined radius, or be in a specific direction, of the controller, as will be explained below. In this way, where the first vehicle is has been broken into, or there has been an attempted break-in on the first vehicle, and the security system of the first vehicle is activated, the first vehicle, via the controller, is able to communicate with one or more other vehicles (for example, other vehicles within a vicinity of the first vehicle or in a specific direction) to activate their security systems as well. In this way, activation of the security system of the (first) vehicle that has been broken into can activate a wider network of security systems (which, as will be explained below may comprise cameras) in order to effectively provide a security network around the (first) vehicle that has been broken into. This, in turn, means that as a thief who broke into the (first) vehicle moves away from the vehicle (e.g. runs away with stolen goods), one or more other vehicles may be able to track their movement, thereby increasing the chance of their capture, e.g. by law enforcement.

The security system of the first vehicle may comprise an audio capturing device (e.g. a device comprising a microphone) and/or video image capturing device (e.g. a device comprising a camera). Activating the security system of the first vehicle may comprise automatically turning on the audio and/or video capturing device of the first vehicle. In this example, if a person (for example an unauthorized user of the first vehicle) is within a certain proximity (e.g. comes within a predetermined radius of the first vehicle) this may trigger the image capturing device to capture audio and/or video images of the first vehicle's surroundings. In this example the controller may be further configured to attach metadata to any audio and/or video captured by the capturing device of the first vehicle. For example, the attached metadata may comprise location metadata and/or time metadata that can be attached to the captured data to describe the attack to another user viewing the captured data. In this way, any images may be time stamped and/or geo-tagged to improve the interrogation of the captured footage. This makes the resulting footage easier to break down and extract relevant information. The instructions may be to store any captured data (e.g. tagged captured data) either on the vehicle or remotely, e.g. in a cloud device, for example to thereafter be interrogated (e.g. by police). The instructions may therefore be to send any captured data (e.g. tagged captured data) to a cloud device for remote storage or to send any captured data to a location for remote interrogation (e.g. by police).

The instructions may comprise instructions to cause the controller of the second vehicle to automatically turn on an audio and/or video image capturing device of the second vehicle. In this example, when the security system of the first vehicle is activated the controller is configured to activate an audio and/or video image capturing device of the second vehicle. For example, if a person (e.g. an unauthorized user) triggers the first vehicle's security system the controller may be effectively triggered to switch on an audio capturing device and/or a video capturing device of a second vehicle. This will enable the capture of audio and/or video images of the second vehicle's surroundings, and therefore may enable the second vehicle to capture video images of the thief breaking into, or attempting to break into, the first vehicle from the perspective/location of the second vehicle. In the example where the first vehicle's safety system also comprises an audio and/or video capturing device, activation of the first vehicle's capturing device may cause the second vehicle's capturing device to be activated, effectively therefore capturing two video feeds of the first vehicle (one from the first vehicle itself and the other from the second vehicle).

As above, the controller may be further configured to attach metadata to any audio and/or video captured by the capturing device of the second vehicle. For example, the attached metadata may comprise location metadata and/or time metadata that can be attached to the captured data to describe the attack to another user viewing the captured data.

The security system of the first vehicle may comprise an alarm system. In this example, activating the safety mechanism of the first vehicle may comprise triggering the alarm. For example a person (e.g. an unauthorized user) may enter a predetermined radius, or proximity, of the first vehicle causing the alarm to trigger.

The instructions may comprise instructions to cause the controller of the second vehicle to activate an alarm system of the second vehicle. In this example when the security system of the first vehicle is activated (which may comprise triggering a capture device of the first vehicle or an alarm of the first vehicle) an alarm of the second vehicle may be activated. For example, if a thief, having activated the security system of the first vehicle, started to run away, the alarm systems of other vehicles may be activated alerting more people of the presence of the unusual activity than if only the security system of the first vehicle were activated.

In one example, the controller is configured to transmit the signal to all vehicles within a predetermined radius of the first vehicle's location. In this example if a person activates the safety system of the first vehicle, the security systems of all vehicles in a predetermined radius (e.g. 1 mile, 5 km, etc.) may be activated (e.g. caused to activate by the instructions of the signal transmitted by the controller). As above, if a thief, having activated the security system of the first vehicle, started to run away, the security systems of all other vehicles within this radius may be activated. If the security system of another vehicle in the radius comprises an alarm then this may alert more people (e.g. people within the predetermined radius and beyond due to the compounding alarm signals) of the presence of the unusual activity than if only the security system of the first vehicle were activated. If the security system of another vehicle in the radius comprises a capturing device, then this may enable audio and/or video data from a wider range/plurality of locations to be captured.

In another example, the controller may be configured to transmit the signal to all vehicles in a first direction of the first vehicle's location. In this example if a person activates the safety system of the first vehicle, and then decides to run away from the first vehicle in a specific direction, the controller may be configured to activate the security system.

Accordingly, in one example the controller may be remote from the first vehicle. In this example the controller may be configured to determine whether the security system of the first vehicle has been activated. Alternatively, the first vehicle may be configured to determine whether its security system has been activated and transmit the signal (as described above). A vehicle, e.g. the first vehicle, may therefore comprise the controller, as described above. In these examples, the controller, being provided on the first vehicle, may be configured to determine whether the security system of the first vehicle has been activated, or may receive a signal from another device on the vehicle, the other device being configured to determine whether its security system has been activated and alert the controller.

The security systems described herein may be proximity-activated (e.g. activated when any user, or an unauthorized user, comes within a predetermined distance of the vehicle) or may be otherwise activated, for example in response to a sensor on the vehicle detecting unauthorized activity (e.g. a detecting user manipulation of a door handle, detecting a break in a door or window, etc.).

According to another example there is provided a method comprising determining whether a security system of a first vehicle is activated and, if it is determined that the security system is activated, transmitting a vehicle-to-vehicle signal to a second vehicle, the signal comprising instructions that, when executed by a controller of the second vehicle, cause the controller of the second vehicle to activate a security system of the second vehicle.

The security system of the first vehicle may comprises an audio and/or video image capturing device and determining whether the security system of the first vehicle is activated may comprise determining whether the audio and/or video image capturing device is activated. The method may further comprise attaching metadata to any audio and/or video captured by the capturing device of the first vehicle.

The instructions may comprise instructions to cause the controller of the second vehicle to automatically turn on an audio and/or video image capturing device of the second vehicle. The method may further comprise attaching metadata to any audio and/or video captured by the capturing device of the second vehicle.

The security system of the first vehicle may comprise an alarm system.

The instructions may comprise instructions to cause the controller of the second vehicle to activate an alarm system of the second vehicle.

The method may comprise determining whether there are any vehicles within a predetermined radius of the first vehicle's location and transmitting the signal to all vehicles within a predetermined radius of the first vehicle's location.

The method may comprise determining a first direction relative to the first vehicle's location, determining whether there are any vehicles in the first direction, and transmitting the signal to all vehicles in the first direction.

According to another example there is provided a non-transitory machine-readable storage medium, encoded with instructions executable by a processor, the machine-readable storage medium comprising instructions to, when executed by the processor, cause the processor to perform the method as described above.

Therefore the instructions may comprise instructions to cause a processor of a first vehicle to transmit a vehicle-to-vehicle (hereafter "V2V") signal to a second vehicle, the V2V signal comprising instructions that, when executed by a processor (e.g. a processor of a controller) of the second vehicle, cause a security system of the second vehicle to activate (e.g. under the control of a controller). The instructions may comprise instructions that, when executed by the second vehicle processor, cause the second vehicle processor to do at least one of: activate an alarm of the second vehicle, activate an audio capturing device of the second vehicle, and activate a video capturing device of the second vehicle. The instructions may comprise instructions that, when executed by the second vehicle processor, cause the second vehicle processor to attach metadata to any captured data, such as location and/or time metadata.

Accordingly, aspects of this disclosure may relate to the sequential triggering of (the security systems of) each vehicle in a fleet of, connected, vehicles. As will be described below with specific reference to the figures which depict example implementations of the present disclosure, the security systems of each vehicle that are sequentially triggered may be different and may comprise activating an audio/video recording device and/or an alarm system. For example, if an activated video or audio recording device detects movement of an unauthorized person in one direction, this may cause video or audio recording devices of other vehicles in that direction so that video or audio of the person may be captured as they continue to move. In another example, where it is undetermined in which direction the person has moved (e.g. an alarm system has been triggered that does not have the functional capabilities of determining the direction someone has moved), this may cause the alarm systems of all vehicles within a radius of that vehicle to be activated, to alert other people to the general area of the unauthorized activity.

In this way a thief, or would-be thief, that has triggered the security system of one vehicle may be "followed" by the activated security systems of other vehicles. In this way the triggering of one security system may set off a chain reaction of the security systems of other vehicles that can concentrate on the movements of an unauthorized user.

BRIEF DESCRIPTION OF THE DRAWINGS

For a better understanding of the present disclosure, and to illustrate how certain examples may be put into effect, examples will now be described with reference to the accompanying drawings in which.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
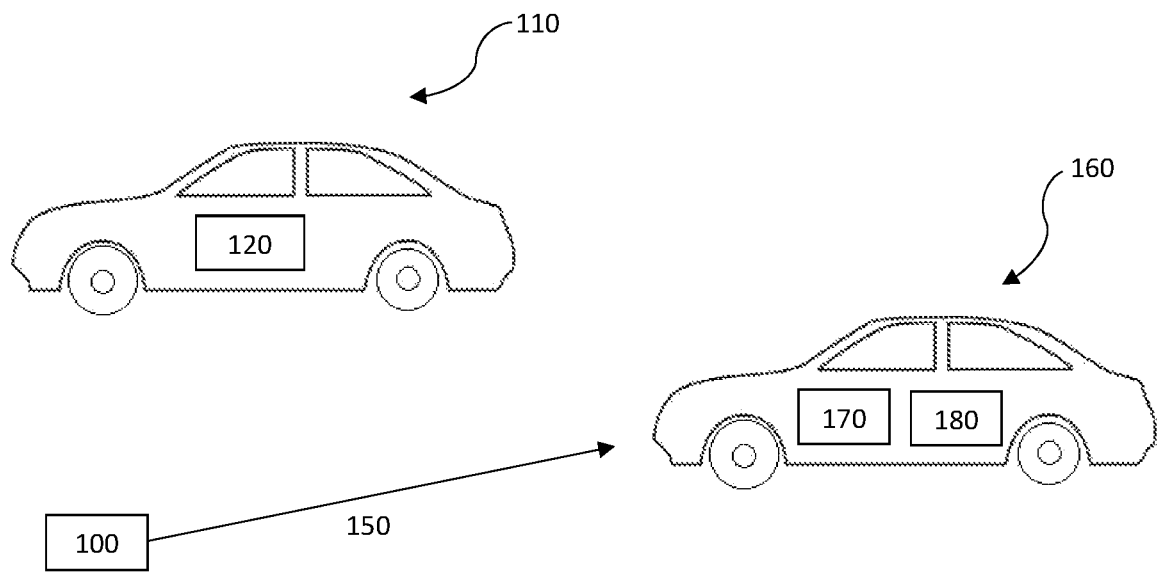
FIG. 1 is a schematic view of a system comprising a controller according to an example of the invention.

FIG. 1 shows a controller 100. The controller 100 is for a first vehicle 110. The first vehicle 110 comprises a security system 120. The controller 100 is configured to, when a security system 120 of the first vehicle 110, is activated transmit 150 a vehicle-to-vehicle (V2V) signal to a second vehicle 160. The second vehicle 160 comprises a controller 170 and a security system 180. The transmitted signal 150 comprises instructions that, when executed by the controller 170 of the second vehicle causes the controller 170 to activate the security system 180 of the second vehicle 160.

As will be explained with reference to specific examples below, the security system 120 of the first vehicle 110 and/or the security system 180 of the second vehicle 160 may comprise an audio capture device and/or a video capture device and/or an alarm system. Of course, it will be appreciated that in other examples the security system may be other than an audio/video capture device or alarm system. The controller 100 of the first vehicle 110 and/or the controller 170 of the second vehicle 160 may be configured to attach metadata to any audio and/or video data captured by the respective controller.

Figure 2:
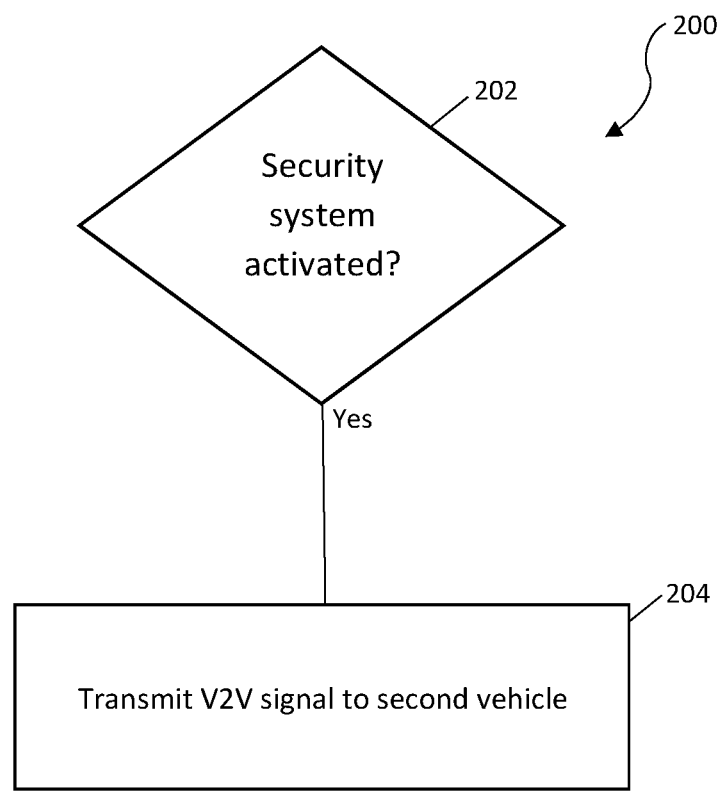
FIG. 2 is a flowchart of an example method.

FIG. 2 shows an example method 200. The method comprises, at block 202, determining whether a security system of a first vehicle is activated and, if it is activated, then the method comprises, at block 204, transmitting a V2V signal to a second vehicle, the signal being as described above with reference to FIG. 1. In other words, the signal comprising instructions that, when executed by a controller of the second vehicle, cause the controller of the second vehicle to activate a security system of the second vehicle. The first vehicle may be the vehicle 110 as shown in FIG. 1, the second vehicle may be the vehicle 160 shown in FIG. 1 etc.

Some examples of the controller 100 (with reference to FIG. 1) and some examples of the method 200 (with reference to FIG. 2) will now be described with reference to FIGS. 3A-3D.

Figure 3A:
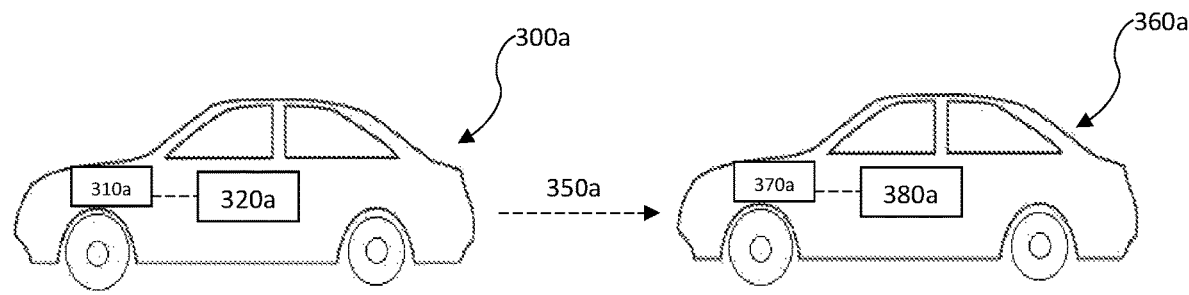
FIGS. 3A-3D are schematic views of systems, each comprising a controller according to an example of the invention.

FIG. 3A shows an example vehicle 300a (which may be the first vehicle as shown in FIG. 1 or the method 200 etc.) comprising a controller 310a and image capture device 320a. In other words, when the vehicle 300a is the first vehicle 110 (of the FIG. 1 example), the image capture device 320a is the security system 120. Upon activation of the image capture device 320a, the controller 310a is to transmit 350a a V2V signal to a second vehicle 360a, comprising a second vehicle controller 370a and a second vehicle image capture device 380a, that comprises instructions that, when executed by the controller 370a will cause the controller 370a to activate the image capture device 380a of the second vehicle. Therefore, in this example, activation of an image capturing device 320a of the first vehicle 300a causes an image capturing device 380a of the second vehicle 300a to be activated. In this way, both the first and second vehicles 300a, 360a are taking still images, or video recordings (e.g. a live feed) of the respective areas in the vicinity of these vehicles, enabling a more comprehensive picture of the first vehicle's surroundings to be captured, which may aid in locating the person who triggered the first vehicle's image capture device and has moved toward the second vehicle.

Figure 3B:
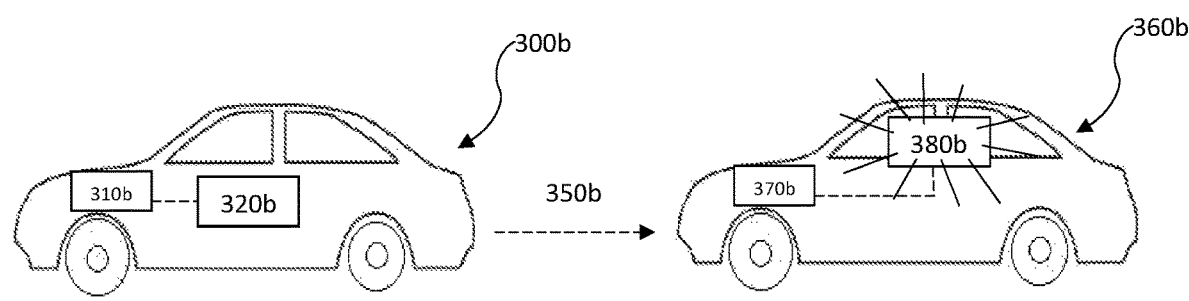

FIG. 3B shows an example vehicle 300b (which may be the first vehicle as shown in FIG. 1 or the method 200 etc.) comprising a controller 310b and an image capture device 320b. In other words, when the vehicle 300b is the first vehicle 110 (of the FIG. 1 example), the image capture device 320b is the security system 120. Upon activation of the image capture device 320b, the controller 310b is to transmit 350b a V2V signal to a second vehicle 360b, comprising a second vehicle controller 370b and an alarm system 380b, that comprises instructions that, when executed by the controller 370b will cause the controller 370b to activate the alarm system 380b of the second vehicle. Therefore, in this example, activation of an image capturing device 320b of the first vehicle 300b causes an alarm system 380b of the second vehicle 300b to be activated. In this way, the first vehicle is taking still images, or video recordings (e.g. a live feed) of the area in the vicinity of the first vehicle, and users proximate the second vehicle 300b may be alerted to the presence of unauthorized activity in the vicinity of the second vehicle via the alarm.

Figure 3C:
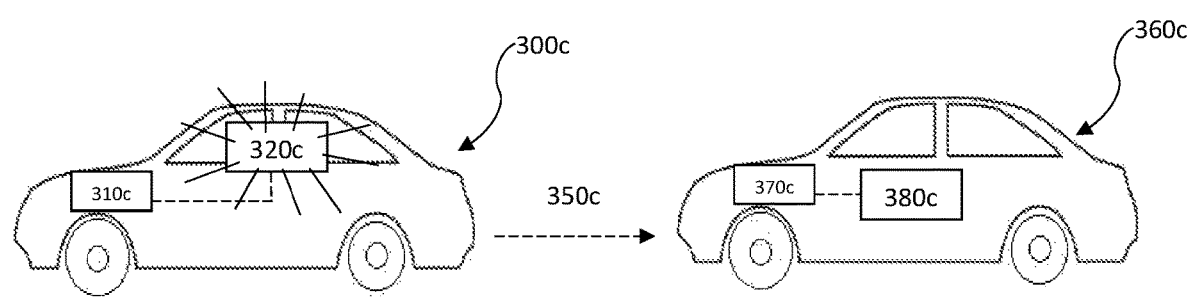

FIG. 3C shows an example vehicle 300c (which may be the first vehicle as shown in FIG. 1 or the method 200 etc.) comprising a controller 310c and an alarm system 320c. In other words, when the vehicle 300c is the first vehicle 110 (of the FIG. 1 example), the alarm system 320c is the security system 120. Upon activation of the alarm system 320c, the controller 310c is to transmit 350c a V2V signal to a second vehicle 360c, comprising a second vehicle controller 370c and a second vehicle image capture device 380c, that comprises instructions that, when executed by the controller 370c will cause the controller 370c to activate the image capture device 380c of the second vehicle. Therefore, in this example, activation of the alarm system 320c of the first vehicle 300c causes an image capturing device 380c of the second vehicle 300c to be activated. In this way, users proximate the first vehicle 300c may be alerted to the presence of unauthorized activity in the vicinity of the first vehicle via the alarm while the second vehicle is taking still images, or video recordings (e.g. a live feed) of the area in the vicinity of the first vehicle, for example to capture images of the person who triggered the alarm of the first vehicle and who has moved toward the second vehicle.

Figure 3D:
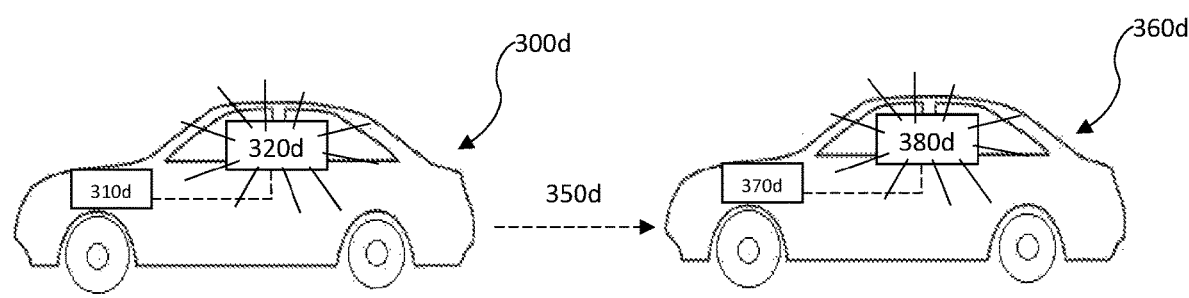

FIG. 3D shows an example vehicle 300d (which may be the first vehicle as shown in FIG. 1 or the method 200 etc.) comprising a controller 310d and an alarm system 320d. In other words, when the vehicle 300d is the first vehicle 110 (of the FIG. 1 example), the alarm system 320d is the security system 120. Upon activation of the alarm system 320d, the controller 310d is to transmit 350d a V2V signal to a second vehicle 360d, comprising a second vehicle controller 370d and a second vehicle alarm system 380d, that comprises instructions that, when executed by the controller 370d will cause the controller 370d to activate the alarm system 380d of the second vehicle. Therefore, in this example, activation of an alarm system 320d of the first vehicle 300d causes an alarm system 380d of the second vehicle 300d to be activated. In this way, users proximate the second vehicle 300d may be alerted to the presence of unauthorized activity in the vicinity of the second vehicle. Therefore, in this example, activation of an alarm system 320d of the first vehicle 300d causes an alarm system 380d of the second vehicle 300d to be activated. In this way, users in the vicinity of the first and second vehicles 300d, 360d may be alerted to the presence of unauthorized activity in the vicinity of the second vehicle via the alarms, and therefore a network of noise may follow a thief or would-be thief to draw attention to their location.

Therefore, according to some examples, other vehicles may activate their security system upon hearing the alarm system of another vehicle to record images, or audio, of the environment surrounding the other vehicle. It will readily be appreciated how the examples of FIGS. 3A-3D lend themselves to fleets comprising a larger number of vehicles. This will be described with reference to FIGS. 4 and 5 but, for example, the system may be configured such that, as much as possible, an alleged thief never leaves the field of vision of one or more cameras of a vehicle before the camera on another vehicle is activated, or does not leave the field of vision of one camera before another camera is activated.

In one example, metadata is assigned to any captured data (e.g. audio and/or video data captured by the image capture device 320a,b and/or 380a,c). In these examples the tagged (e.g. with metadata) and captured data may be stored (e.g. on a vehicle or in a remote cloud device) for later interrogation (e.g. remote interrogation by police) or transmitted to another location (e.g. a received, e.g. located at a police station) for subsequent interrogation (e.g. by police) remote from a vehicle. Such an example is shown in FIG. 4.

Figure 4:
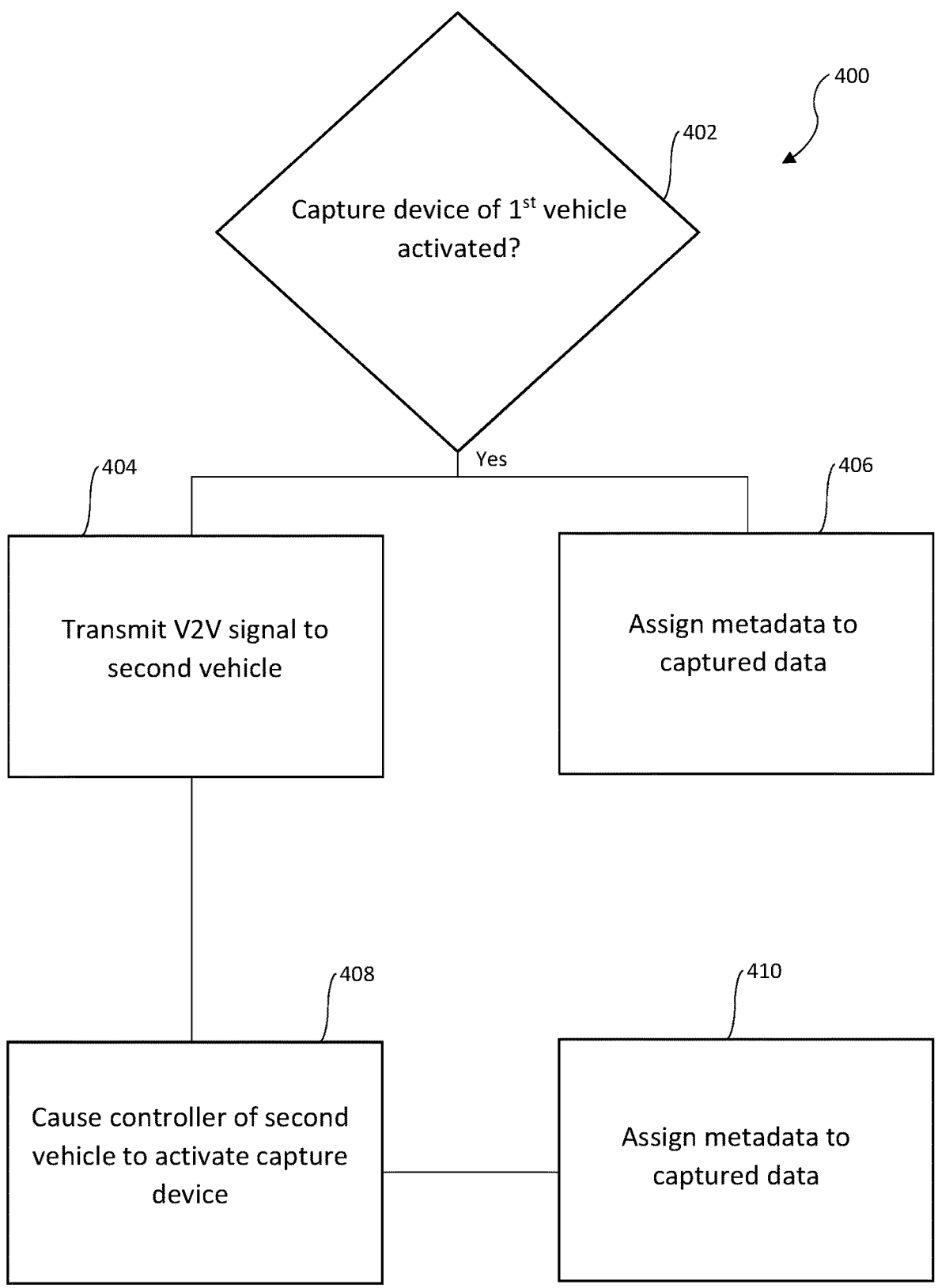
FIG. 4 is a flowchart of an example method.

FIG. 4 shows one example method 400 which may be part of the method 200 as shown in FIG. 2, and which is described with reference to FIG. 3A. At block 402 it is determined whether the security system of the first vehicle 300a is activated. More specifically, it is determined if an image capture device 320a of the first vehicle 300a has been activated and, if so, at block 404 the method transmits 350a the V2V signal (for example as described above with reference to block 202 of the method 200) and, at block 406, metadata is assigned to the data captured by the image capture device 310a of the first vehicle 300a. Upon receipt of the transmitted signal and having processed the instructions comprised therein the controller 370a of the second vehicle 360a causes, at block 408, an image capture device 380a of the second vehicle 360a to activate. At block 410, metadata is assigned to the data captured by the image capture device 380a of the second vehicle 360a. The metadata (such as that assigned at block 406 and/or 410) may comprise at least one of location-based data and time-based data. For example, the metadata may contain data describing the location of the vehicle from which the audio and/or video data were captured. The method 400 may comprise transmitting any captured data (e.g. to a remote device for storage) or storing the captured data (e.g. on a database on a vehicle).

It will be appreciated that these particular examples of the types of security systems are exemplary only and are non-exhaustive. They are presented here for illustrative purposes only. In other examples the security system of the first and/or second vehicle may be different to that described above. For example, the security system of the first vehicle may comprise a system to place the first vehicle in a "high security mode" in which a number of security settings are triggered (e.g. doors locked, sensors switched on etc.). In this example activating the first vehicle's security system may comprise placing the first vehicle in the high security mode and the instructions (of the V2V signal transmitted by the first vehicle controller) may comprise instructions that, when executed by a controller of the second vehicle, place the second vehicle in a high security mode. In this way, upon activation of the security system of first vehicle, placing that vehicle in a high security mode, a fleet of nearby vehicles may each be placed in a high security mode and so a chain reaction may cause a connected fleet of vehicles to be locked to prevent break-ins.

Two examples of implementations of the invention will now be described with reference to FIGS. 5 and 6.

Figure 5:
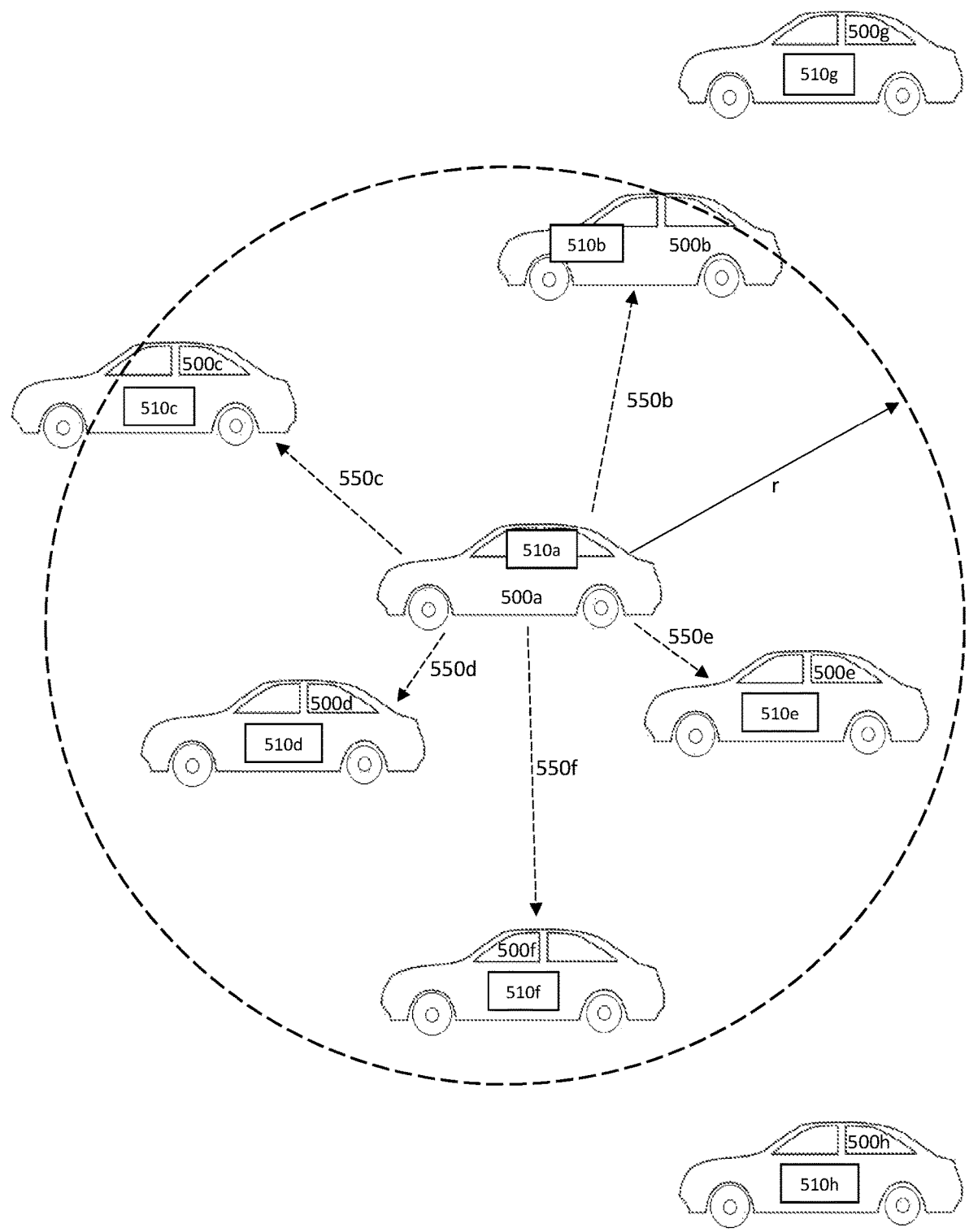
FIG. 5 is a schematic view of a system comprising a controller according to an example of the invention.

FIG. 5 schematically shows a fleet of vehicles 500a-h. Each vehicle comprises a respective controller, 510a-h. In this example the controller 510a of a first vehicle 500a is configured to transmit a signal 550b-f to all vehicles 500b-f within a predetermined radius r of the first vehicle 500a. Therefore, in this example, the vehicles 500g and 500h are outside of the predetermined radius and so no signal is transmitted to these vehicles by the first vehicle 500a. Therefore, the security systems of the vehicles 500g and 500h are not activated in this example. It will be appreciated that the controller 510a of the first vehicle transmits a plurality of signals 550b-f to respective vehicles 500b-f, causing the security systems of those vehicles, 510b-f, respectively, to be activated. It will be appreciated that the security systems 510b-f of those (second) vehicles 500b-f within the predetermined radius may be different. For example, the signal 550b may cause the controller 510b to activate a video capturing device of the vehicle 500b, the signal 550c may cause the controller 510c to activate an audio capturing device of the vehicle 500c, the signal 550d may cause the controller 510d to activate an alarm of the vehicle 500d, etc.

Figure 6:
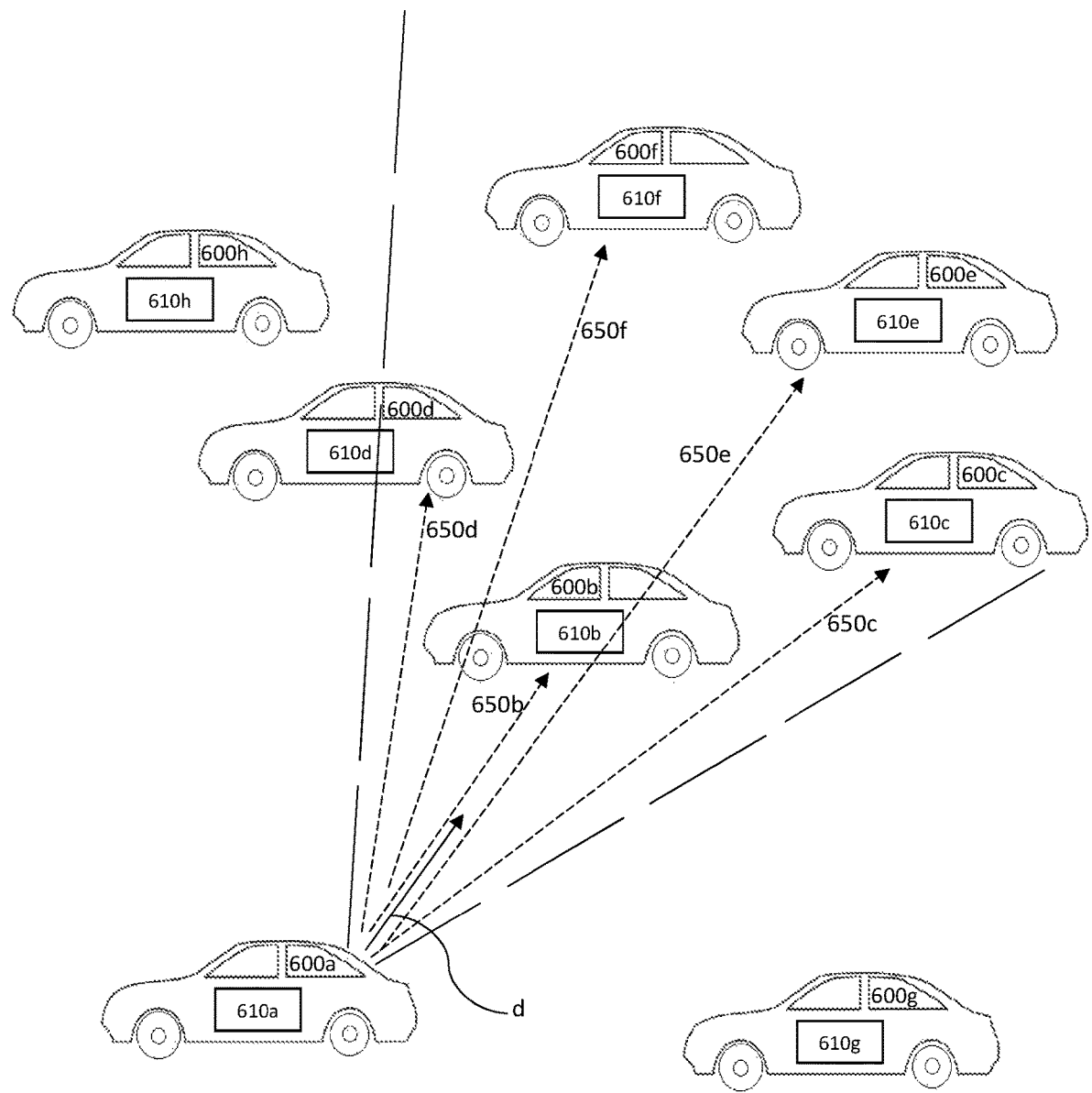
FIG. 6 is a schematic view of a system comprising a controller according to an example of the invention.

FIG. 6 schematically shows a fleet of vehicles 600a-h. Each vehicle comprises a respective controller, 610a-h. In this example the controller 610a of a first vehicle 600a is configured to transmit a signal 650b-f to all vehicles 600b-f in a first direction d of the first vehicle 600a. In this example the first direction d is defined as a visibility cone extending in a first direction d, having the direction d at its center. In this way the first direction may be regarded as a general direction. In this example, the vehicles 600g and 600h are outside of the first distance (general direction) and so no signal is transmitted to these vehicles by the first vehicle 600a. Therefore, the security systems of the vehicles 600g and 600h are not activated in this example. It will be appreciated that the controller 610a of the first vehicle transmits a plurality of signals 650b-f to respective vehicles 600b-f, causing the security systems of those vehicles, 610b-f, respectively, to be activated. It will be appreciated that the security systems 610b-f of those (second) vehicles 600b-f within the predetermined radius may be different. For example, the signal 650b may cause the controller 610b to activate a video capturing device of the vehicle 600b, the signal 650c may cause the controller 610c to activate an audio capturing device of the vehicle 600c, the signal 650d may cause the controller 610d to activate an alarm of the vehicle 600d, etc.

It will be appreciated that the examples shown in FIGS. 5 and 6 are for illustrative purposes only and that a connected fleet of vehicles may be such that the triggering of the security system of a first vehicle causes that vehicle to send a V2V signal to all vehicles in a general direction, or first direction, of that first vehicle, one of which may be a second vehicle. A controller of that second vehicle may send a V2V signal to all vehicles within a first radius of that second vehicle, one of which may be a third vehicle. That third vehicle may send a V2V signal to all vehicles in a second direction of that third vehicle etc. in this way building a comprehensive picture of the movements of an alleged thief.

While the present disclosure has been illustrated and described in detail in the drawings and foregoing description, such illustration and description are to be considered illustrative or exemplary and not restrictive; the invention is not limited to the disclosed embodiments. Various alternative examples are discussed through the detailed description. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A hardware controller for a first vehicle, the controller being configured to:
responsive to a security system of the first vehicle being activated, transmit a vehicle-to-vehicle signal directionally to all vehicles within a visibility cone extending from a center of the first vehicle along a defined direction, the visibility cone including a second vehicle, the signal comprising instructions that, when executed by a controller of the second vehicle, cause the controller of the second vehicle to activate a security system of the second vehicle,
wherein the controller is further configured to attach metadata to audio and/or video captured by audio and/or video image capturing devices of the first or second vehicles.

2. The controller of claim 1 wherein the security system of the first vehicle comprises an audio and/or video image capturing device, and activating the security system of the first vehicle comprises automatically turning on the audio and/or video image capturing device of the first vehicle,
wherein the controller is further configured to attach metadata to any audio and/or video captured by the audio and/or video image capturing device of the first vehicle.

3. The controller of claim 1, wherein the instructions comprise instructions to cause the controller of the second vehicle to automatically turn on an audio and/or video image capturing device of the second vehicle,
wherein the controller is further configured to attach metadata to audio and/or video captured by the audio and/or video image capturing device of the second vehicle.

4. The controller of claim 1, wherein the security system of the first vehicle comprises an alarm system.

5. The controller of claim 1, wherein the instructions comprise instructions to cause the controller of the second vehicle to activate an alarm system of the second vehicle.

6. The controller of claim 1, wherein the controller is a component of the first vehicle.

7. The controller of claim 1 wherein a third vehicle is outside of the visibility cone, such that the third vehicle does not receive the vehicle-to-vehicle signal and does not activate a security system of the third vehicle.

8. A method comprising:
determining a first direction relative to a current location of a first vehicle;
responsive to determining a security system of the first vehicle is activated, transmitting a vehicle-to-vehicle signal directionally to all vehicles within a visibility cone extending from a center of the first vehicle in the first direction, the visibility cone including a second vehicle, the signal comprising instructions that, when executed by a controller of the second vehicle, cause the controller of the second vehicle to activate a security system of the second vehicle; and
attaching metadata to audio and/or video captured by audio and/or video image capturing devices of the first or second vehicles.

9. The method of claim 8, wherein the security system of the first vehicle comprises an audio and/or video image capturing device, and wherein determining the security system of the first vehicle is activated comprises determining that the audio and/or video image capturing device is activated, further comprising attaching metadata to audio and/or video captured by the audio and/or video image capturing device of the first vehicle.

10. The method of claim 8, wherein the instructions comprise instructions to cause the controller of the second vehicle to automatically turn on an audio and/or video image capturing device of the second vehicle, further comprising attaching metadata to audio and/or video captured by the audio and/or video image capturing device of the second vehicle.

11. The method of claim 8, wherein the security system of the first vehicle comprises an alarm system.

12. The method of claim 8, wherein the instructions comprise instructions to cause the controller of the second vehicle to activate an alarm system of the second vehicle.

13. The method of claim 8 wherein a third vehicle is outside of the visibility cone, such that the third vehicle does not receive the vehicle-to-vehicle signal and does not activate a security system of the third vehicle.

14. A non-transitory machine-readable storage medium, encoded with instructions executable by a processor of a controller of a vehicle, the machine-readable storage medium comprising instructions to, when executed by the processor, cause the processor to perform operations including to:
- detect movement of an unauthorized person in a direction with respect to the vehicle; and
- responsive to a security system of the vehicle being activated, transmit a vehicle-to-vehicle signal directionally to other vehicles within a visibility cone extending in the direction from a center of the vehicle, the signal comprising instructions that, when executed by respective controllers of the other vehicles within the visibility cone, cause the respective controllers of the other vehicles to activate security systems of the other vehicles to track movement of the unauthorized person, wherein the respective controllers are further configured to attach metadata to audio and/or video captured by audio and/or video image capturing devices of the respective other vehicles.

15. The medium of claim 14 wherein a third vehicle is outside of the visibility cone, such that the third vehicle does not receive the vehicle-to-vehicle signal and does not activate a security system of the third vehicle.

* * * * *